United States Patent
Heymans et al.

(10) Patent No.: US 8,086,690 B1
(45) Date of Patent: Dec. 27, 2011

(54) DETERMINING GEOGRAPHICAL RELEVANCE OF WEB DOCUMENTS

(75) Inventors: Maureen Heymans, Sunnyvale, CA (US); Radhika Malpani, Palo Alto, CA (US); Noam Shazeer, Palo Alto, CA (US); Abhay Puri, Mountain View, CA (US)

(73) Assignee: Google Inc., Mountain View, CA (US)

( * ) Notice: Subject to any disclaimer, the term of this patent is extended or adjusted under 35 U.S.C. 154(b) by 2510 days.

(21) Appl. No.: 10/665,359

(22) Filed: Sep. 22, 2003

(51) Int. Cl.
*G06F 15/16* (2006.01)

(52) U.S. Cl. ........................................ 709/217

(58) Field of Classification Search .................. 709/217
See application file for complete search history.

(56) References Cited

U.S. PATENT DOCUMENTS

| | | | | |
|---|---|---|---|---|
| 6,070,157 | A * | 5/2000 | Jacobson et al. | 1/1 |
| 6,473,084 | B1 * | 10/2002 | Phillips et al. | 345/440 |
| 6,665,715 | B1 * | 12/2003 | Houri | 709/223 |
| 6,701,307 | B2 * | 3/2004 | Himmelstein et al. | 707/3 |
| 7,117,199 | B2 * | 10/2006 | Frank et al. | 707/3 |
| 2002/0002552 | A1 * | 1/2002 | Schultz et al. | 707/3 |
| 2002/0042789 | A1 * | 4/2002 | Michalewicz et al. | 707/3 |
| 2002/0059094 | A1 * | 5/2002 | Hosea et al. | 705/10 |
| 2002/0138479 | A1 * | 9/2002 | Bates et al. | 707/5 |
| 2002/0156779 | A1 * | 10/2002 | Elliott et al. | 707/6 |
| 2003/0023489 | A1 * | 1/2003 | McGuire et al. | 705/14 |
| 2003/0036949 | A1 * | 2/2003 | Kaddeche et al. | 705/14 |
| 2003/0061211 | A1 * | 3/2003 | Shultz et al. | 707/3 |
| 2003/0076805 | A1 * | 4/2003 | Agrawal et al. | 370/338 |
| 2003/0158777 | A1 * | 8/2003 | Schiff et al. | 705/14 |
| 2003/0187949 | A1 * | 10/2003 | Bhatt et al. | 709/218 |
| 2003/0212519 | A1 * | 11/2003 | Campos et al. | 702/101 |
| 2003/0217052 | A1 * | 11/2003 | Rubenczyk et al. | 707/3 |

OTHER PUBLICATIONS

Scarfe et al., "System and method of detecting events", International Publication No. WO 02/15479 A1, PCT/GB01/03450, Feb. 21, 2002.*

Co-pending U.S. Appl. No. 10/664,929; Adam Smith et al.; "Systems and Methods for Clustering Search Results"; filed Sep. 22, 2003; 30 pages.

* cited by examiner

*Primary Examiner* — Vivek Srivastava
*Assistant Examiner* — William Goodchild
(74) *Attorney, Agent, or Firm* — Harrity & Harrity, LLP

(57) ABSTRACT

A geographic relevance component determines geographic relevance of web resources based on an analysis of data points that correspond to estimated physical locations of the IP addresses of a number of visitors to the web site. The geographic relevance component may additionally determine the probability that a particular user is within the geographical relevance corresponding to a web resource.

44 Claims, 8 Drawing Sheets

| Web Site | User IP Addresses |
|---|---|
| $URL_1$    301-1 | $IP_{1,1}, IP_{2,1}, \ldots, IP_{J,1}$    305-1 |
| $URL_2$    301-2 | $IP_{1,2}, IP_{2,2}, \ldots, IP_{K,2}$    305-2 |
| $\vdots$ | $\vdots$ |
| $URL_N$    301-N | $IP_{1,N}, IP_{2,N}, \ldots, IP_{M,N}$    305-N |

Fig. 3

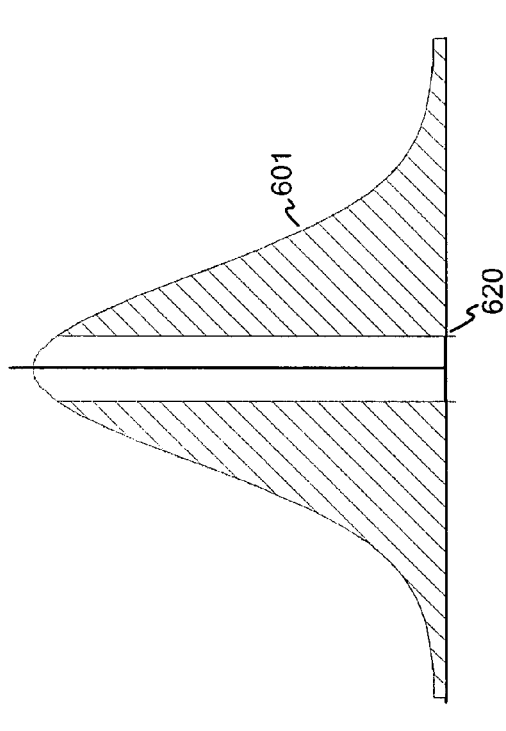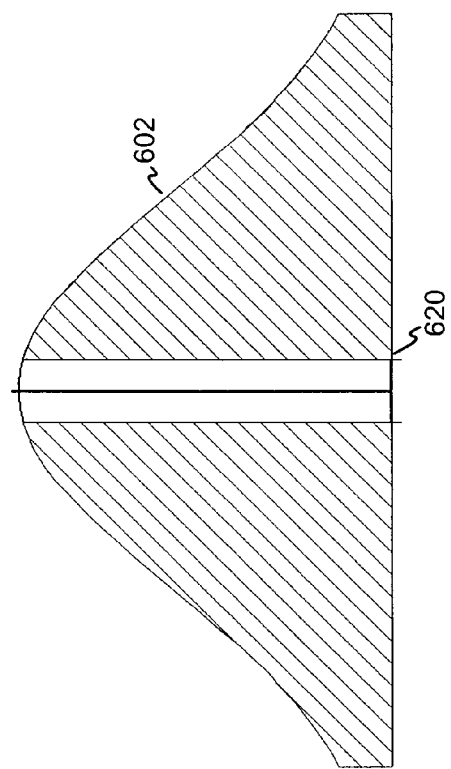
Fig. 7A
Fig. 7B

DETERMINING GEOGRAPHICAL RELEVANCE OF WEB DOCUMENTS

BACKGROUND OF THE INVENTION

A. Field of the Invention

The present invention relates generally to web documents, and more particularly, to the geographical relevance of web documents.

B. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web documents in which a user is interested. Generally, search engines base their determination of the user's interest on search terms (called a search query) entered by the user. The goal of the search engine is to provide links to high quality, relevant results to the user based on the search query. Typically, the search engine accomplishes this by matching the terms in the search query to a corpus of pre-stored web pages. Web documents that contain the user's search terms are "hits" and are returned to the user.

Some web documents may be of particular interest to users that reside in certain geographical areas. For example, web documents associated with an on-line newspaper may be of most relevance to the geographical area covered by the newspaper. Web documents associated with local businesses or organizations are additional examples of web documents that may be of particular interest to a geographical area. Thus, it can be desirable for a search engine to know whether a web document has geographical significance and when it does, the geographical locations associated with the web document.

One known approach to determining geographical relevance is to have humans manually classify web pages. For a large set of web documents, however, this approach can be labor intensive and expensive. Another known approach is to construct an automated parser to analyze the text associated with web documents. The parser may look for geographic terms, such as zip codes or telephone area codes in order to associate the web document with a geographic location(s). This approach can be problematic, however, as geographic terms are often used for web documents that are not necessarily relevant to a particular geographic area. For example, a national on-line retailer may have a specific mailing address but nevertheless be equally relevant to all geographical locations. Additionally, automated parsers can have difficulty finding and distinguishing geographic terms.

Yet another known approach to determining geographical relevance is to use the Internet Protocol (IP) address of the web server to locate the web document. A number of services are available for determining the location of a server based on the IP address. This technique, however, has the disadvantage that a web document may be hosted by a server at a location remote from the geographic relevance of the web document.

Accordingly, there is a need in the art to more effectively be able to determine the geographical relevance and location(s) of web documents, such as a web page.

SUMMARY OF THE INVENTION

The potential geographic relevance of documents is determined based on a set of users that access the document.

A first aspect consistent with the invention is directed to a method of associating a resource with a geographic location to which the resource relates. The method includes determining location information associated with users that access the resource and performing a cluster analysis based on the location information.

A second aspect of the invention is directed to a method of providing documents. The method includes collecting location information associated with first users that access a resource, performing an analysis on the collected location information to determine the geographic relevance of the resource, and determining second location information associated with a second user. The method further includes determining whether to provide a document associated with the resource to the second user based, at least in part, on a matching of the geographic relevance of the resource to the second location information.

Yet another aspect consistent with the invention is directed to a method of associating a resource with a geographic location to which the resource relates. The method includes determining a plurality of locations associated with users that access the resource and analyzing the determined locations to determine geographical relevance.

Yet another aspect consistent with the invention is directed to a search engine. The search engine includes a document selector component configured to locate a set of documents relevant to a search query. The document selector component bases the determination of relevancy at least in part on geographic relevance information associated with documents in the set of documents. The search engine additionally includes a geographic relevance component configured to generate the geographic relevance information associated with the documents in the set of documents by gathering network addresses of users that access the documents in the set of documents, mapping the plurality of network addresses to location data points, and performing a cluster analysis on the location data points.

BRIEF DESCRIPTION OF THE DRAWINGS

The accompanying drawings, which are incorporated in and constitute a part of this specification, illustrate the invention and, together with the description, explain the invention. Like elements may be illustrated with identical numbers in different figures. In the drawings.

FIG. 3 is a diagram illustrating an exemplary table relating web sites to the IP addresses of users that tend to visit the web sites;

FIGS. 7A and 7B are diagrams that illustrate probabilities associated with two Gaussian distributions for a first distance from the center of a cluster.

DETAILED DESCRIPTION

The following detailed description of the invention refers to the accompanying drawings. The detailed description does not limit the invention. Instead, the scope of the invention is defined by the appended claims and equivalents.

As described herein, a geographic relevance component determines whether web resources, such as web sites, documents, or URLs are geographically relevant to particular geographical location(s). The determination of relevance is based on the locations of multiple users that visit the web resource.

Exemplary System Overview

Figure 1:
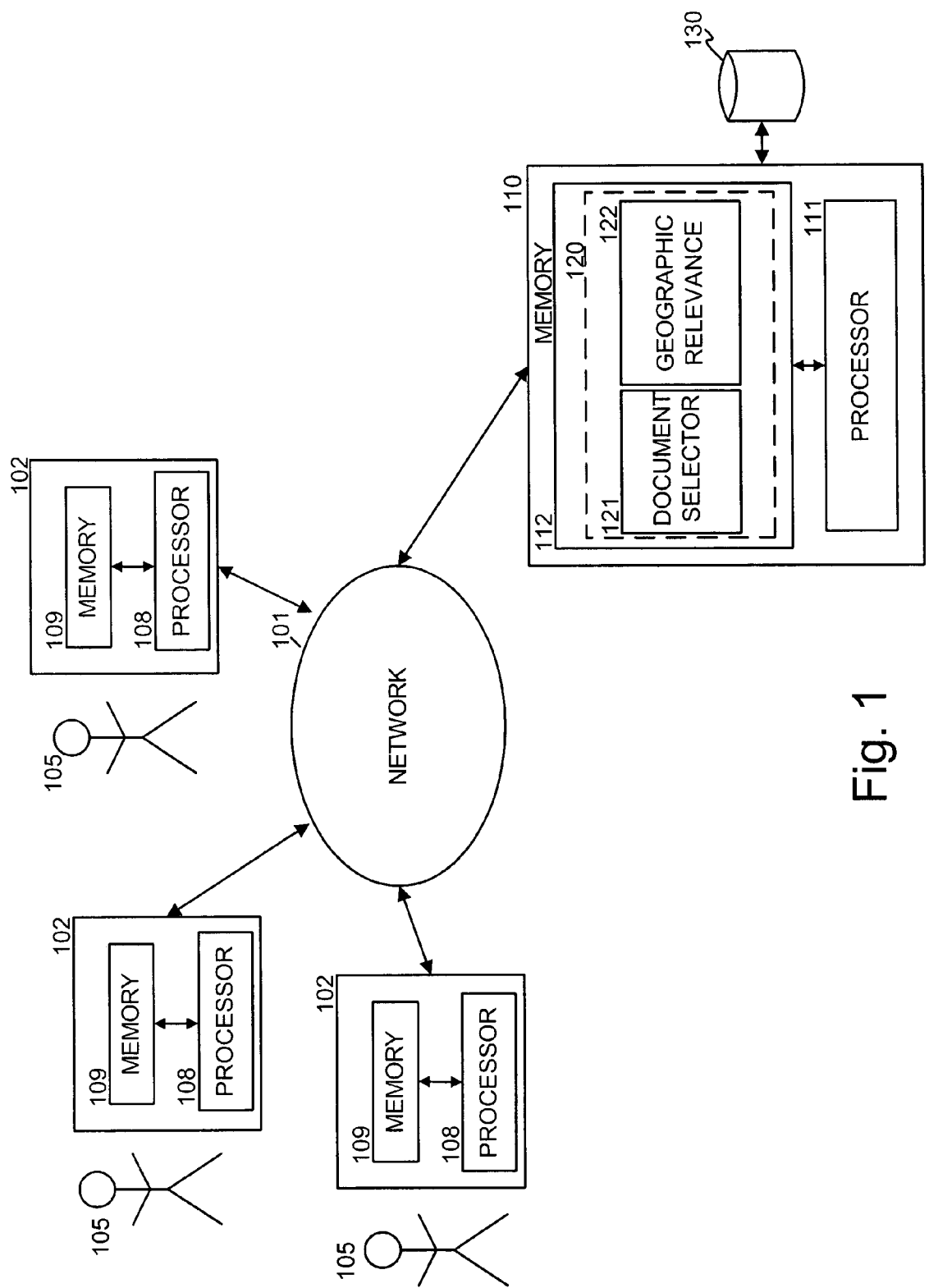
FIG. 1 is a diagram illustrating an exemplary system in which concepts consistent with the present invention may be implemented.

FIG. 1 is a diagram illustrating an exemplary system in which concepts consistent with the present invention may be implemented. The system includes multiple client devices 102, a server device 110, and a network 101, which may be, for example, the Internet. Client devices 102 each include a computer-readable medium 109, such as random access memory, coupled to a processor 108. Processor 108 executes program instructions stored in memory 109. Client devices 102 may also include a number of additional external or internal devices, such as, without limitation, a mouse, a CD-ROM, a keyboard, and a display.

Through client devices 102, users 105 can communicate over network 101 with each other and with other systems and devices coupled to network 101, such as server device 110.

Similar to client devices 102, server device 110 may include a processor 111 coupled to a computer-readable memory 112. Server device 110 may additionally include a secondary storage element, such as database 130.

Client processors 108 and server processor 111 can be any of a number of well known computer processors. In general, client device 102 may be any type of computing platform connected to a network and that interacts with application programs, such as a digital assistant or a "smart" cellular telephone or pager. Server 110, although depicted as a single computer system, may be implemented as a network of computer processors.

Memory 112 may contain a search engine program 120. Search engine program 120 locates relevant information in response to search queries from users 105. In particular, users 105 send search queries to server device 110, which responds by returning a list of relevant information to user 105. Typically, users 105 ask server device 110 to locate web pages relating to a particular topic and stored at other devices or systems connected to network 101. Search engine 120 may include document selector 121 and a geographic relevance component 122. In general, document selector 121 finds a set of documents, such as web documents, whose contents match a user search query. Geographic relevance component 122 may determine whether particular web documents have a particular geographic relevance. In addition, for documents that have a particular geographic relevance, geographic relevance component 122 may determine one or more geographic location(s) corresponding to the documents.

Document selector 121 may initially locate documents from a document corpus stored in database 130 by comparing the terms in the user's search query to the documents in the corpus. In general, processes for indexing web documents and searching the indexed corpus of web documents to return a set of documents containing the searched terms are well known in the art. Accordingly, this functionality of document selector 121 will not be described further herein.

Search engine 120 may use information generated by geographic relevance component 122 (either in real-time or pre-generated) in returning relevant documents to the user. Geographic relevance component 122 may, for example, determine that a particular user is browsing from within a particular geographical area or is interested in information associated with a location of interest. For example, a user's geographic location or location of interest may be determined by an IP address, a cookie or user profile, account information associated with the user (including items such as a mailing address, etc.), search terms or other information entered by a user, browsing habits including browsing and search history, or any combination of these techniques and other similar techniques known by those of ordinary skill in the art. In this case, the search engine may bias the web documents returned to the user in response to a user search query to give extra weight to documents that are geographically relevant to the location of the user (or location of interest to the user).

Information derived by geographic relevance component 122 can be used be in applications other than in assisting a search engine. For example, it may be useful for other purposes to generate a list of documents that are relevant to a particular geographic location.

As used herein, a document is to be broadly interpreted to include any machine readable and machine storable work product. A document may be an email, an advertisement, a file, a combination of files, one or more files with embedded links to other files, etc. In the context of the Internet, a common document is a Web page. Web pages often include content and may include embedded information (such as meta information, hyperlinks, etc.) and/or embedded instructions (such as Javascript, etc.). In the context of advertising provided on the Internet, a document can be considered to be the advertisement itself (whether in the for of a banner advertisements, text advertisement, pop-up or pop-under window, etc.) and/or the web site(s) with which the advertisement is associated (such as the advertiser's home page, the page(s) describing the advertised product or service, the landing page linked to by the advertisements, etc.).

Geographic Relevance Component 122

Figure 2:
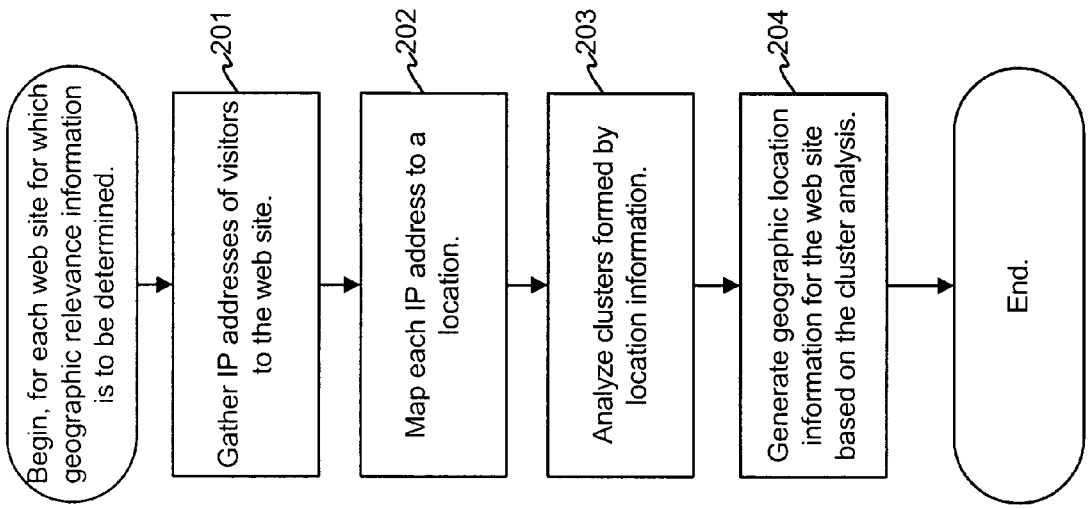
FIG. 2 is a flow chart illustrating exemplary operation of the geographic relevance component shown in FIG. 1.

FIG. 2 is a flow chart illustrating exemplary operation of geographic relevance component 122 in determining geographic relevance for a particular web site, page, document, or uniform resource locator (URL) prefix. Such a web site, page, document, or URL may generally be referred to as a web resource or web site herein.

Geographic relevance component 122 may begin by gathering network addresses, such as Internet Protocol (IP) addresses of visitors to the web site of interest (act 201). In one implementation, this information may be collected through an application that resides on the computers of users while they access web documents, such as a web browser, a browser toolbar, a browser plug-in, or any other client-side application. In one embodiment of the invention, a toolbar that integrates with a browser program may assist the user in searching/browsing the web. As part of its normal operation, the toolbar may collect the IP address of the user and the IP addresses of the web sites visited by the user. The toolbar may occasionally transmit this information to geographic relevance component 122. Geographic relevance component 122 may compile this information for a large number of users to obtain, for a particular web site, a sampling of IP addresses of users that visited that web site.

Other techniques can be used to collect IP addresses or geographic locations of (or associated with) visitors to a web site. For example, IP addresses may be collected from website logs or from proxy logs. Information from user accounts, such as mailing or billing addresses or phone numbers, may be used instead of or in addition to, visitor IP addresses. As another example, the geographic location of a user may be inferred by examining the geographic access patterns associated with the user's web browsing. Thus, the user's location may be inferred from the location of a number of visited web sites.

FIG. 3 is a diagram illustrating an exemplary table relating web sites to the IP addresses of users that tend to visit the web sites. As shown, a number of web sites 301-1 through 301-N may be identified by URLs (uniform resource locator) and may each be associated with a set of IP addresses 305-1 through 305-N. Each set of IP addresses 305 may correspond to the sampled IP addresses of users that visited the corresponding web site 301. Thus, a particular set of IP addresses, such as set 305-1, may include J IP addresses of J users that visited web site 301-1. As described above, the set of IP addresses 305 may be a sampled set of the user IP addresses that visited site 301. In addition, numerous other techniques may be employed to filter the set of IP addresses 305 associated with URLs 301. For example, IP addresses 305-1 may be limited to those corresponding to users that visited $URL_1$ for a predetermined amount of time (thus not counting brief visits and increasing the likelihood that the user IP addresses 305-1 are meaningfully associated with $URL_1$). After compiling a set of IP addresses, such as set 305-1, for a web site, geographic relevance component 122 may determine a geographic location corresponding to each of the IP addresses $IP_{1,1}$ through $IP_{J,1}$ in set 305-1 (FIG. 2, act 202). Techniques are known in the art for approximating the geographical location that corresponds to an IP address. This information may, for example, be purchased from commercial services that distribute this information. Alternatively, by measuring the ping delay between a number of known locations and a target IP address, the location of the target IP address may be estimated. In one implementation, the IP addresses may be mapped to a nearest corresponding city. The city may then be mapped to a two-dimensional coordinate, such as the latitude and longitude of the center of the city.

The estimation of a geographical location that corresponds to an IP address is not an exact process. A user in New York City may, for example, dial the telephone number of an Internet Service Provider (ISP) in San Diego to connect to the Internet. In this situation, the ISP from San Diego will assign the user an IP address that is likely to erroneously map to San Diego. Although errors may occasionally occur when mapping IP address to locations, over a large set of IP address, such as the IP addresses in each of sets 305, the location information will tend to be accurate.

Figure 4:
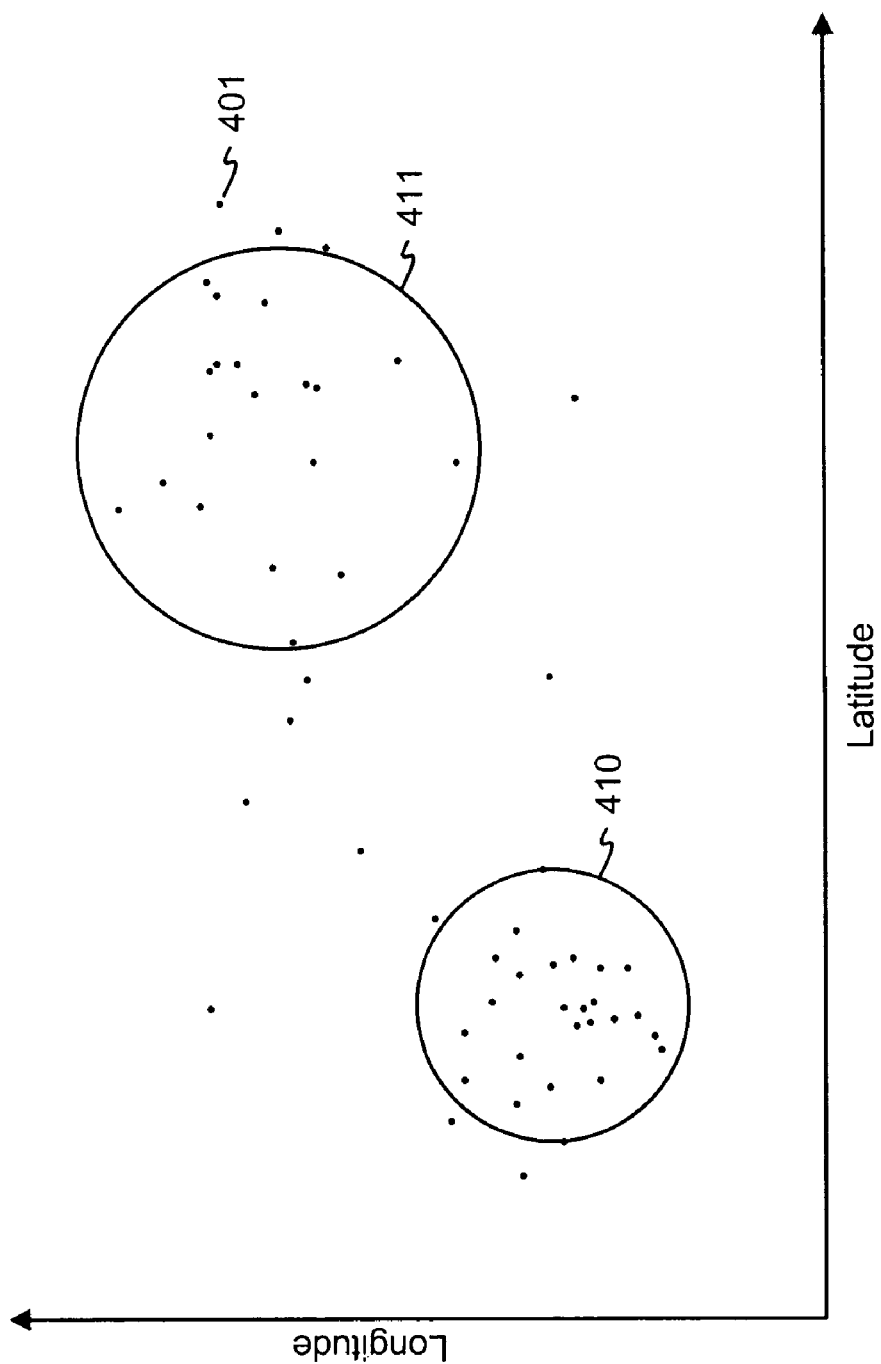
FIG. 4 is a diagram illustrating a number of two-dimensional points corresponding to location information for a particular set of IP addresses.

FIG. 4 is a diagram illustrating a number of two-dimensional points corresponding to location information for a particular set of IP addresses, such as set 305-1. Each point 401 shown in FIG. 4 may be defined by location information, such as the mapped latitude and longitude of the IP address. Geographic relevance component 122 may perform a cluster analysis of points 401 to determine likely clusters (act 203). The cluster analysis may be performed using a clustering algorithm, such as the well known "k-means" clustering algorithm or any other clustering algorithm known in the art. The result of the cluster analysis may be an indication of the number of relevant geographical clusters present in the set of two-dimensional points as well as information describing the clusters. For example, a cluster may be defined as being centered around a certain city with a spread of 10 miles and probability mass of 50%.

As an example of cluster analysis, consider the two clusters illustrated by circles 410 and 411 in FIG. 4. Each of clusters 410 and 411 may be defined by a number of parameters, such as the number of points in the cluster, the average distance to the center of the cluster, the center of the cluster (e.g., latitude and longitude value), and the density or dispersion of the points in the cluster. In general, these parameters can be used to ascertain the quality of the cluster. With reference to FIG. 4, for example, cluster 410 is a relatively dense cluster and geographic relevance component 122 may consider this to be a "good" cluster that indicates geographic relevance. Cluster 411, in contrast, may not indicate any particular geographic relevance.

Based on the cluster analysis performed in Act 203, geographic relevance component 122 may assign geographical location information to the web site (FIG. 2, act 204). More specifically, as discussed above, if the two-dimensional location points 401 corresponding to an IP set 305 are relatively evenly dispersed, geographic relevance component 122 may determine that there is no clear cluster, which indicates that the corresponding web site may not be relevant to a particular geographical location. This may occur with websites that are targeted to a national or world-wide audience. If, however, geographic relevance component 122 determines that there are one or more well defined clusters (e.g., cluster 410), geographic relevance component 122 may associate the corresponding web site with the geographic location(s) around which the cluster is centered.

The operations shown in the flow chart of FIG. 2 may generally be used to associate web sites with appropriate geographic locations. These operations can be automated and can thus be cost effectively applied to a large number of web sites. Additionally, by using locations derived from IP addresses of multiple users, errors in mapping IP addresses to locations are filtered from the results.

In some implementations, additional operations may be used by geographic relevance component 122 to refine the generated geo-relevance information. One such operation may include normalizing the frequencies of visitors to a web site to account for high population areas. Large cities, or cities having a high proportion of Internet users, may introduce bias into the geo-location information. For instance, a web site in upstate New York may be particularly relevant to a small town in upstate New York. Even though a large portion of the Internet users from the small town may frequently visit the web site while only a very small portion of the Internet users from New York City may visit the web site, the absolute number of users coming from New York City may be fairly high due to the large population of New York City relative to the small town. Accordingly, bias may be introduced into the cluster analysis that may tend to obscure the fact that the web site is geographically relevant to the small town.

Geographic relevance component 122 may correct for the potential bias introduced by disparate sizes of different cities by normalizing the frequencies of visitors based on the population of the city or the number of visitors from the city to which the visitor is mapped. The normalization may be performed by, for example, scaling the total number of visitors from a particular city by a factor proportional to the population of the particular city. Other techniques for correcting bias may be used. For example, in the case of a low number of data points, smoothing techniques could be used to reduce noise.

Another factor that geographic relevance component 122 may take into account when determining geographic relevance is whether the IP address of the visitor to the web site is a static or dynamic IP address. In general, a static IP address is an IP address that is permanently associated with a single user while dynamic IP addresses are IP addresses that may be associated with different users. Frequently, dynamic IP addresses are given on a per-session basis to users that connect to their ISP via a dial-up account. Because the location information that is obtained from the IP addresses of dial-up users tends to be less reliable than other users, the location information corresponding to dynamic IP addresses may in-turn be less reliable than that corresponding to static IP addresses. Accordingly, in some implementations, whether an IP address is static or dynamic may also be used by geographic relevance component 122 in determining geographic relevance. For example, geographic relevance component 122 may exclude dynamic IP addresses from IP sets 305 or assign greater relevance weights to static IP addresses in IP sets 305.

As will be recognized by those of ordinary skill in the art, many other techniques may also be used to refine the location relevance determination. For example, visits from a subset of page visitors with known locations (perhaps because of external or prior data) may be weighted higher. Weighting may generally be done, with higher confidence information given greater weight. Alternatively, only visits from a set of known visitors may be used.

The above discussion focused on geographic relevance component 122 determining whether a particular web site is geographically relevant and if so, determining the geographical locations to which the web site is relevant. In another implementation, geographic relevance component 122 may determine the probability that a particular user should be considered to be within (or associated with) a geographical cluster or a geographical location (such as cluster 410).

Figure 5:
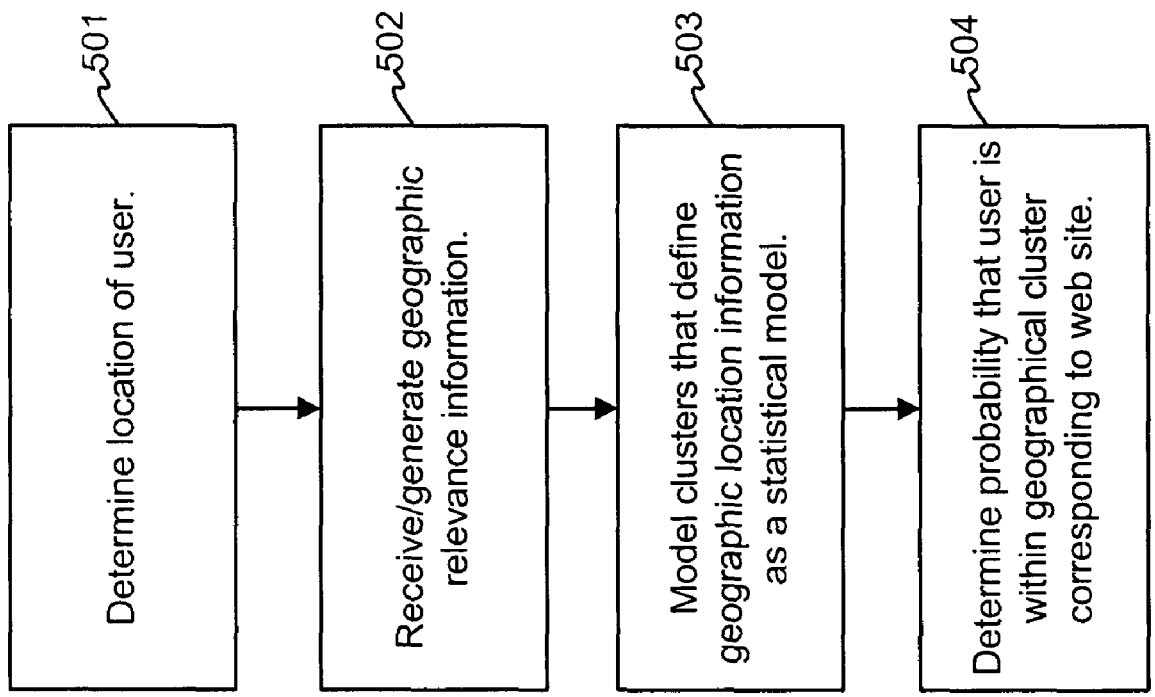
FIG. 5 is a flow chart illustrating operations consistent with aspects of the invention for determining the probability that a particular user is within a geographical cluster.

FIG. 5 is a flow chart illustrating operations consistent with aspects of the invention for determining the likelihood that a particular user is within the geographical relevance of a web site. One way to compute this is based on Gaussian models of a geographical clusters. The probability can be defined as the weighted sum of the probability that the user's location is in each of the clusters. In one embodiment, the weights are the probability mass (percentage of visitors) of each cluster. The generated probability may be particularly useful in the context of a user performing a search using search engine 120. In this situation, search engine 120 may use the likelihood that a user's location is geographically relevant to a potential set of returned web documents to modify the returned web documents. For example, geographically relevant web documents may be given a higher priority in the returned set of web documents. According to another aspect of the invention, geographically relevant advertisements may be identified and presented to users.

To begin, geographic relevance component 122 may determine the relevant location of the user performing the search (act 501). The relevant location of the user may be determined based on any one or more of several methods, such as those set forth above. For example, the user's relevant location may be based on the search query submitted by the user; search queries that contain a specific geographic reference, such as the search query "pizza San Francisco," may be interpreted to mean that the user is in or is interested in the specific geographic location (e.g., San Francisco). Alternatively, the IP address of the user may be used to estimate the location of the user. The relevant location of the user might also be determined by examining the geographic relevance of web sites visited (recently, most frequently, etc.) by the user, wherein the web site geographic relevance is determined according to the methods set forth herein.

Other techniques for determining the geographic relevance of a user may be employed. For example, by using the documents a set of users are accessing and the locations associated to them, geographic relevance component 122 can define the location of the users. This process of defining geographical relevance of a web page and geographical locations of users can be performed in an iterative way and computed simultaneously. Some graphical modeling using bipartite graphs (one side of the graphs being the web documents and the other side the users (or their cookies), and links between these two sets of nodes representing the web access of pages) could be used. The information concerning the location of documents or users could be initialized by the locations associated with the IP addresses of the users and then propagated inside the network (in a iterative way) thru the links between pages and users.

In the context of mobile devices, the relevant location of the user can be determined by techniques known in the art. For example, the relevant location may be determined or estimated based on global positioning system (GPS) information or, in the case of cellular transmission, triangulation using multiple cellular phone towers.

Geographic relevance component 122 may also receive or generate the geographic relevance information for a web page or advertisement (act 502). This geographic relevance information may be the geographic location information described above with respect to acts 203 and 204.

Figure 6:
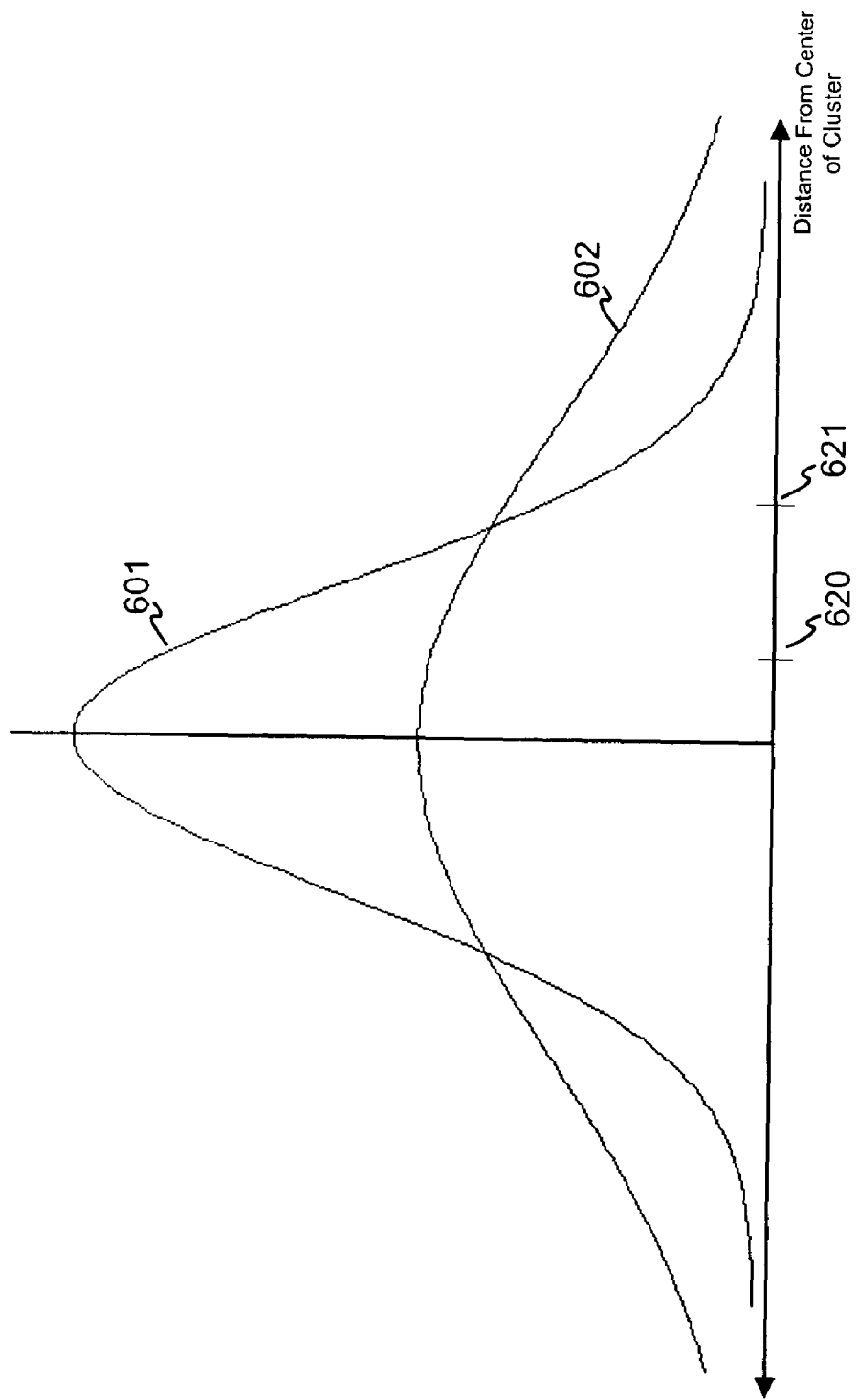
FIG. 6 is a diagram that graphically illustrates two exemplary Gaussian probability curves.

Geographic relevance component 122 may model the clusters defined in the geographic location information as a statistical model, such as a Gaussian model (act 503). The model may, for example, be implemented as a Gaussian curve. FIG. 6 is a diagram that graphically illustrates two exemplary Gaussian probability curves, labeled as curves 601 and 602. The problem that a user belongs to the geographical cluster of a web site can be defined by the density of the Gaussian curve at the location of the user and by normalizing the densities of all clusters at this point to sum to one. The density is the value of the Gaussian curve at the latitude and longitude of the user location. As shown, curve 601 is a "tighter" curve that corresponds to a cluster that is relatively tightly packed and thus has a lower dispersion (e.g., cluster 410). Curve 602 may correspond to a cluster with a higher dispersion (e.g., cluster 411).

One of ordinary skill in the art will appreciate that statistical models other than Gaussian models could alternatively be used in act 503.

Figure 8A:
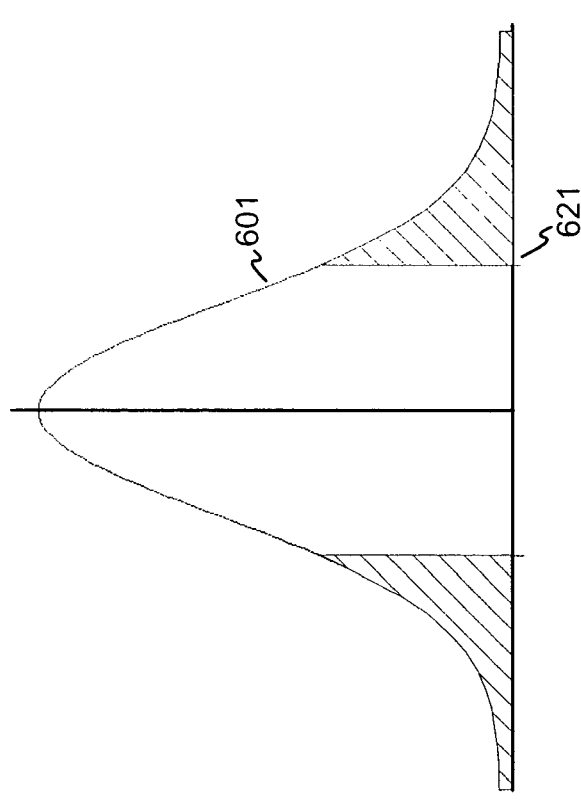
FIGS. 8A and 8B are diagrams that illustrate probabilities associated with two Gaussian distributions for a second distance from the center of a cluster.
Figure 8B:
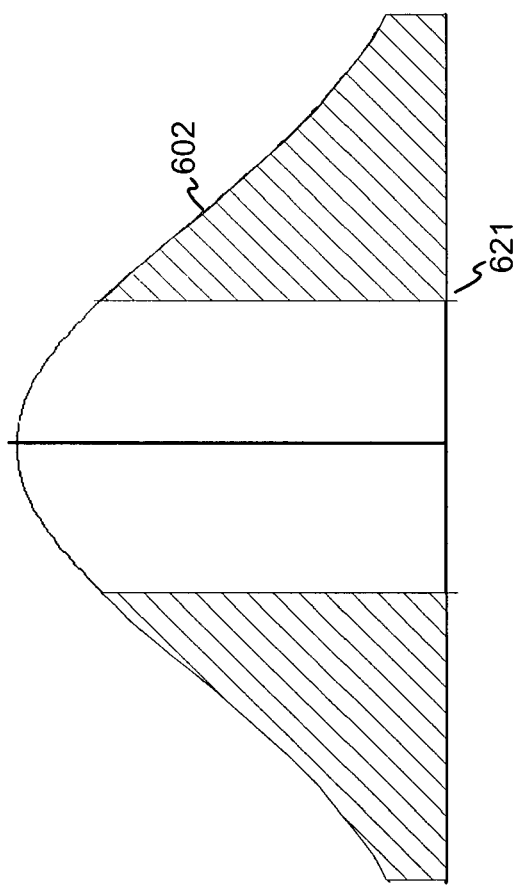

Geographic relevance component 122 may determine, based on the Gaussian model, the probability that the user is within the geographical cluster of the web site (act 504). Referring to FIG. 6, this probability may be graphically illustrated as the area under the Gaussian curve that runs from the location of the user (relative to the location of the web site) to infinity. Point 620, for example, may correspond to the distance between the location of the web site and the user. Point 620 is relatively close to the location of the web site. Accordingly, the probability that the user is within the geographical location of the web site is relatively high for both curves 601 and 602. This probability is shown graphically as the shaded areas in FIGS. 7A (curve 601) and 7B (curve 602), in which the probability corresponds to the shaded area of curves 601 and 602 divided by the total area of curves 601 and 602, respectively. As can be seen from these figures, the shaded areas of curves 601 and 602 include most of the total area of the curve. Assume, however, that the distance between the location of the web site and the user is illustrated by point 621 in FIG. 6. In this situation, the probability that the user is within the geographical location of the web site is lower for both curves 601 and 602, and is significantly lower for curve 601. These probabilities are shown graphically as shaded areas in FIGS. 8A (curve 601) and 8B (curve 602). As can be seen from these figures, the ratio of the shaded area in FIG. 8A to the total area under curve 601 is relatively low (i.e., ~0.2). The ratio of the shaded area in FIG. 8B to the total area under curve 602 (i.e., ~0.5) is lower than that shown in FIG. 7B but still higher than that shown in FIG. 8A.

As will be recognized by one of ordinary skill in the art, the principles of the invention may be used in a variety of applications. For example, the invention may be used to determine and present geographically relevant advertisements to users. In one embodiment, the geographical relevance of an advertiser or advertisement may be determined based on the location of visitors to the advertiser's web site(s) or the landing page of the advertisement. In another implementation, search engine 120 may assume that a user that visits a web site that has been determined to be geographically relevant may be interested in advertisements that relate to that geographic location. The present invention may also be employed to determine the geographic locations to which a document is relevant and the likelihood of a user being associated with a geographic location to deliver more relevant content (e.g. search results, advertisements, etc.) to the user.

CONCLUSION

Geographic relevance component 122, as described herein, determines whether documents such as web sites, advertisements, URLs, etc. are geographically relevant to particular geographical location(s). Geographic relevance component 122 may then output the geographical locations for which a document is relevant. The determination of whether a document is geographically relevant can be based on a cluster analysis of two-dimensional points that correspond to estimated physical locations of a number of visitors to the document. In additional potential implementations consistent with the invention, geographic relevance component 122 may determine the probability that a particular user is within a geographical cluster or the geographical relevance corresponding to a document and increase the weighting of the document in response thereto.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such.

The scope of the invention is defined by the claims and their equivalents.

What is claimed is:

1. A method of providing documents comprising:
   collecting, by one or more processors, location information associated with first users that access a resource;
   performing, by one or more processors, an analysis on the collected location information to determine a geographic relevance of the resource;
   determining, by one or more processors, second location information associated with a second user; and
   providing, by one or more processors, a document associated with the resource to the second user based, at least in part, on a matching of the geographic relevance of the resource to the second location information.

2. The method of claim 1, wherein the resource is a web document.

3. The method of claim 2, wherein the document associated with the resource is an advertisement.

4. The method of claim 1, wherein the location information includes network addresses of the first users.

5. The method of claim 4, further comprising:
   mapping the network addresses to two-dimensional coordinate information.

6. The method of claim 1, wherein collecting the location information further comprises collecting the location information from multiple first users, and
   wherein performing the analysis further comprises performing a cluster analysis.

7. The method of claim 1, wherein the document associated with the resource is the same as the resource.

8. The method of claim 1, wherein collecting the location information associated with the first users includes collecting at least one of location information stored in cookies, location information derived from search terms entered by the user, or location information derived from browsing patterns.

9. A computer-implemented search engine comprising:
   a processor; and
   a memory coupled to the processor, the memory comprising:
   a document selector component configured to locate a set of documents relevant to a search query, the document selector component basing the determination of relevancy at least in part on geographic relevance information associated with documents in the set of documents; and
   a geographic relevance component configured to generate the geographic relevance information associated with the documents in the set of documents by gathering a plurality of network addresses of users that access the documents in the set of documents, mapping the plurality of network addresses to location data points, and performing a cluster analysis on the location data points to locate clusters of the located data points, the located clusters indicating areas of geographic relevance,
   where the computer-implemented search engine returns search results to a user based on the set of documents.

10. The computer-implemented search engine of claim 9, wherein the geographic relevance component performs the cluster analysis on the location data points based on a determination of whether the location data points form one or more clusters.

11. The computer-implemented search engine of claim 10, wherein the geographic relevance component additionally determines a probability that a location associated with a user that submitted the search query is geographically relevant to the documents in the set of documents based on a statistical model applied to the one or more clusters.

12. The computer-implemented search engine of claim 9, wherein, when performing the cluster analysis on the location data points, the geographic relevance component is further configured to normalize the location data points.

13. The computer-implemented search engine of claim 12, wherein the normalizing is based at least in part on population associated with the location data points.

14. A method for determining a probability that a geographic location of a user submitting a search query is geographically relevant to a network resource, the method comprising:
 determining, by one or more processors, a geographic location associated with the user;
 acquiring, by one or more processors, geographic relevance information for the network resource, the geographic relevance information including information that defines at least one cluster associated with the network resource, the information defining the at least one cluster including at least a center point of the cluster and a measure of dispersion of the cluster;
 determining, by one or more processors, the probability that the geographic location of the user is geographically relevant to the network resource based on a statistical model applied to the at least one cluster; and
 returning, by one or more processors, search results to the user based on the determined probability.

15. The method of claim 14, wherein acquiring the geographic relevance information for the network resource includes:
 gathering a plurality of network addresses of users that access the network resource;
 mapping the plurality of network addresses to location data points; and
 performing a cluster analysis on the location data points to generate the geographic relevance information.

16. The method of claim 15, wherein performing the cluster analysis further includes:
 determining whether the location data points tend to form one or more clusters.

17. The method of claim 16, wherein performing the cluster analysis further includes:
 associating geographic location information with the network resource based on the one or more clusters.

18. The method of claim 15, wherein mapping the plurality of network addresses to the location data points includes:
 associating the gathered network addresses with two-dimensional points defined by latitude and longitude values estimated from the network address.

19. The method of claim 15, wherein mapping the plurality of network addresses to the location data points further includes:
 mapping the network addresses to cities that are estimated to be within a particular distance to physical locations associated with the network addresses; and
 mapping the cities to two-dimensional points defined by latitude and longitude values.

20. The method of claim 15, wherein the plurality of network addresses are Internet Protocol (IP) addresses.

21. The method of claim 14, wherein the determination of geographic location associated with the user is based on terms in the search query.

22. The method of claim 14, wherein the statistical model is based on a Gaussian model.

23. The method of claim 14, wherein the determination of geographic relevance of the user is based on web access patterns of the user.

24. A device comprising:
 a memory to store instructions; and
 a processor to implement the instruction to:
 collect location information associated with first users that access a resource,
  perform an analysis on the collected location information to determine a geographic relevance of the resource,
  determine second location information associated with a second user, and
  provide a document associated with the resource to the second user based, at least in part, on a matching of the geographic relevance of the resource to the second location information.

25. The device of claim 24, wherein the resource is a web document.

26. The device of claim 25, wherein the document associated with the resource is an advertisement.

27. The device of claim 24, wherein the location information includes network addresses of the first users.

28. The device of claim 27, wherein the processor, when implementing the instructions, is further to:
 map the network addresses to two-dimensional coordinate information.

29. The device of claim 24, wherein the processor, when implementing the instruction to collect the location information, is further to:
 collect the location information from multiple first users, and
 wherein the processor, when implementing the instruction to perform the analysis, is further to:
 perform a cluster analysis.

30. The device of claim 24, wherein the document associated with the resource includes the resource.

31. The device of claim 24, wherein the processor, when implementing the instructions to collect the location information associated with the first users, is further to collect at least one of
 location information stored in cookies,
 location information derived from search terms entered by the user, or
 location information derived from browsing patterns.

32. A method comprising:
 locating, by one or more processors, a set of documents relevant to a search query, where the set documents are relevant to the search query based at least in part on geographic relevance information associated with documents in the set of documents;
 generating, by one or more processors, the geographic relevance information associated with the documents in the set of documents, including:
  gathering a plurality of network addresses of users that access the documents in the set of documents,
  mapping the plurality of network addresses to location data points, and
  performing a cluster analysis on the location data points to locate clusters of the located data points, the located clusters indicating areas of geographic relevance; and
 returning, by one or more processors, search results to a user based on the set of documents.

33. The method of claim 32, wherein performing the cluster analysis on the location data points is based on a determination of whether the location data points form one or more clusters.

34. The method of claim 33, further comprising:
determining a probability that a location associated with a user that submitted the search query is geographically relevant to the documents in the set of documents based on a statistical model applied to the one or more clusters.

35. The method of claim 32, wherein performing the cluster analysis on the location data points includes:
normalizing the location data points.

36. The method of claim 35, wherein normalizing the location data points is based, at least in part, on at least one population associated with the location data points.

37. A device to determine a probability that a geographic location of a user submitting a search query is geographically relevant to a network resource, the device comprising:
a memory to store instructions; and
a processor to implement the instruction to:
determine a geographic location associated with the user,
acquire geographic relevance information for the network resource, the geographic relevance information including information that defines at least one cluster associated with the network resource, the information defining the at least one cluster including at least a center point of the cluster and a measure of dispersion of the cluster,
determine the probability that the geographic location of the user is geographically relevant to the network resource based on a statistical model applied to the at least one cluster, and
return search results to the user based on the determined probability.

38. The device of claim 37, wherein the processor, when implementing the instructions to acquire the geographic relevance information for the network resource, is further to:
gather a plurality of network addresses of users that access the network resource;
map the plurality of network addresses to location data points; and
perform a cluster analysis on the location data points to generate the geographic relevance information.

39. The device of claim 38, wherein the processor, when implementing the instructions to map the plurality of network addresses to the location data points, is further to:
associate the gathered network addresses with two-dimensional points defined by latitude and longitude values estimated from the network address.

40. The device of claim 38, wherein the processor, when implementing the instructions to map the plurality of network addresses to the location data points, is further to:
map the network addresses to cities that are estimated to be within a particular distance to physical locations associated with the network addresses; and
map the cities to two-dimensional points defined by latitude and longitude values.

41. The device of claim 38, wherein the processor, when implementing the instructions to perform the cluster analysis, is further to:
determine whether the location data points tend to form one or more clusters, and
associate geographic location information with the network resource based on the one or more clusters.

42. The device of claim 37, wherein the processor implements the instructions to determine the geographic location associated with the user based on terms in the search query.

43. The device of claim 37, wherein the statistical model is based on a Gaussian model.

44. The device of claim 37, wherein the processor implements the instructions to determine the geographic location associated with the user based on web access patterns of the user.

* * * * *